Aug. 9, 1966  N. L. C. PARFITT  3,265,014
MONORAIL VEHICLES
Filed June 10, 1965  2 Sheets-Sheet 2

Inventor
Norman L. C. Parfitt
Stevens, Davis, Miller & Mosher
Attorneys

United States Patent Office 3,265,014
Patented August 9, 1966

3,265,014
MONORAIL VEHICLES
Norman L. C. Parfitt, Ashby-De-La-Zouch, England, assignor to Cowlishaw Walker & Company Limited, Biddulph, England
Filed June 10, 1965, Ser. No. 462,922
Claims priority, application Great Britain, June 16, 1964, 24,953/64
5 Claims. (Cl. 105—30)

The present invention concerns improvements in or relating to monorail vehicles and in particular vehicles of the kind provided with driving wheels which engage the monorail to propel the vehicles.

Such vehicles are suspended from the rail on which they run and in consequence should be comparatively light in weight.

From this comparative lightness in weight arises one of the main difficulties in the satisfactory operation of such locomotives in that there is corresponding lack of adhesion between the driving wheels and the rail.

It is an object of the present invention to improve the adhesion between the driving wheels and the rail.

From one aspect the invention provides a propulsion suspension unit for a vehicle arranged for movement along a monorail comprising rollers for supporting the vehicle on the monorail and separate driving rollers connected to the vehicle through a multiplying linkage system whereby the weight of the vehicle is transferred to the driving rollers with increased effect to press them firmly against the rail.

From another aspect, the invention provides a monorail vehicle adapted to run on a flanged rail including a suspension unit comprising suspension rollers adapted to run on the flange of the rail to support the weight of the vehicle, driving rollers set in opposition about the rail and mounted both to roll on the rail and to grip the rail between them and a multiplying linkage for supporting the vehicle from the suspension rollers, actuable by the weight of the vehicle for supplying to the driving rollers a force which is effectively greater than the weight of the vehicle to cause the driving rollers to grip the rail. Conveniently each driving roller is mounted between a pair of spaced suspension rollers and the rail is of I-section.

Figure 1:
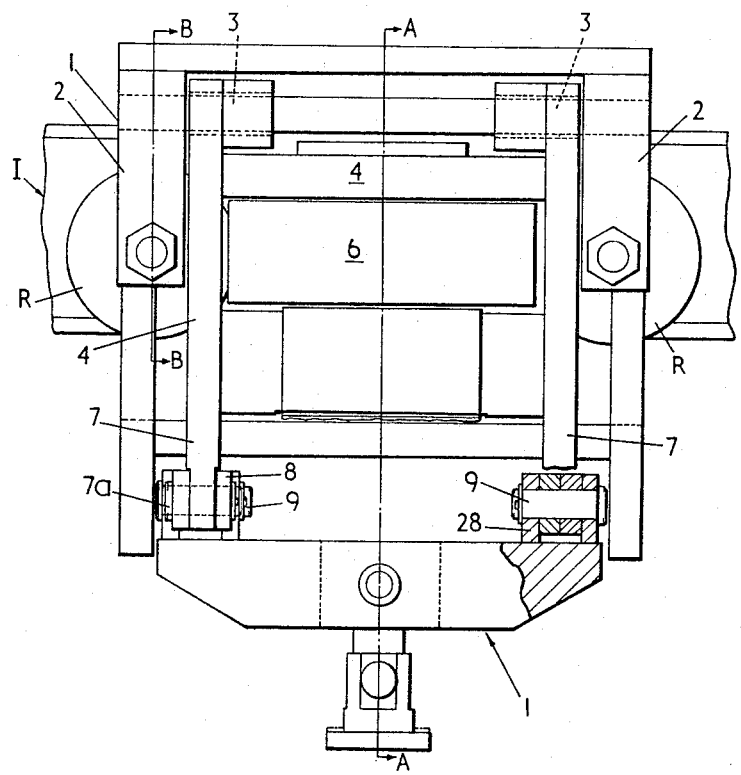
Figure 2:
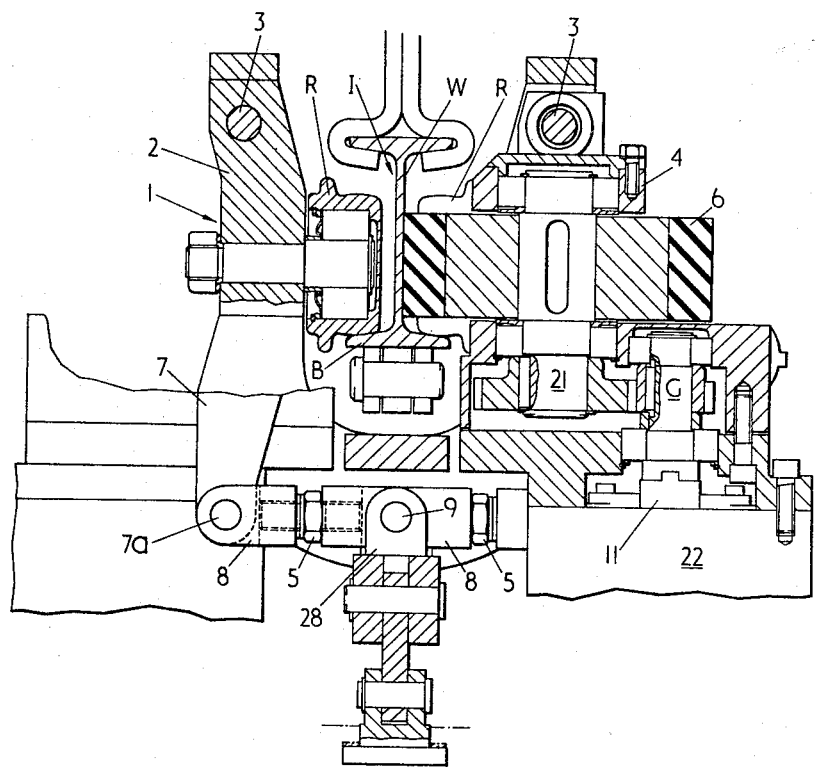

By way of example only, one embodiment of the invention will be hereinafter described with reference to the accompanying drawing in which:

FIGURE 1 shows in side view, a propulsion suspension unit for a monorail vehicle, and FIGURE 2, an end view in which the right hand half is partly sectioned on line AA in FIGURE 1, whilst the left hand half is partly sectioned on line BB in FIGURE 1.

Referring to the drawings a monorail vehicle (not shown) is suspended evenly from two spaced carriages (only one of which is shown) mounted on a rail I of I cross-section.

Each carriage is substantially U-shaped and wide enough to sit about the base B of the rail I with a clearance at each end of the rail I.

Two pairs of convential flanged suspension rollers R are mounted on each carriage 1 towards the ends of the arms of the U-cross section, one pair towards each end of each carriage 1, the rollers R of each pair resting on the base B of the rail I one on each side of the web W of the rail. These suspension rollers R are free to rotate about axes at right angles to arms of the U.

A pair of spaced lugs 2 are formed on opposed sides of each carriage 1, each lug 2 forming an extension of the axis of suspension roller R, and a hinged bearing bracket 4 is pivotally mounted by means of hinge pins 3 from the pair of lugs 2 on each side of the carriage 1. Each hinged bracket 4 is pivotally mounted by means of hinge pins 3 from the pair of lugs 2 on each side of each carriage 1. Each hinged bracket 4 is arranged to swing in a plane at right angles to the rail and carries a vertical spindle 21 on which is mounted a roller 6 drivable through gears G and a transmission shaft 11 and rotatable in a plane at right angles to the plane of rotation of the suspension rollers R. Each roller 6 is located so as to bear on the web W of the rail I and has a curved periphery formed of a hard wearing material having a high coefficient of friction, e.g. polyurethane.

Downwardly projecting lugs 7 are formed integral with the brackets 4 and hinge pins 7a at each end of each bearing bracket 4 locates one end of each of four identical vehicle supporting links 8. The links 8 are connected in opposing pairs to swivel pins 9 from which the vehicle is suspended by upstanding apertured lugs 28.

In this way the weight of the vehicle forces the drivable rollers 6 onto the web W of the rail I and by choosing suitable lengths for the links in the system the force exerted on each of the drivable rollers is well in excess of the appropriate proportion of the weight of the vehicle. The links 8 are conveniently adjustable in length by turning nuts 5 to enable the force applied on the drivable rollers 6 to be easily and speedily varied. Each shaft 11 is driven by a hydraulic drive motor 22 (only part of one of which is shown), each motor being bolted to the underside of the respective hinged bearing bracket 4. Pressure fluid for the hydraulic drive motors is conveniently supplied via flexible hosing from a power pack (not shown) mounted upon the monorail vehicle and comprising a diesel-powered pump and associated fluid storage tank.

I claim:

1. A propulsion suspension unit for a vehicle arranged for movement along a monorail, comprising suspension rollers for supporting the vehicle on the monorail and driving rollers set in opposition about the rail and mounted to both roll along and grip between them a central vertical web of the rail, said driving rollers being mounted at the same level as the suspension rollers and the latter being arranged to roll along flanges extending each side of and at the lower extremity of the said vertical web, the unit further comprising a multiplying linkage from which the vehicle is suspended whereby the force exerted by the weight of the vehicle is transferred evenly to each of the driving rollers to cause them to grip said central vertical web between them with a force which is effectively greater than the weight of the vehicle.

2. A propulsion suspension unit as claimed in claim 1, wherein each driving roller is mounted between a pair of spaced suspension rollers.

3. A propulsion suspension unit as claimed in claim 2, wherein the driving rollers are suspended from the unit on link members free to pivot in a plane transverse to the rail, said link members forming a part of said multiplying linkage.

4. A propulsion suspension unit for a vehicle arranged for movement along a monorail, comprising suspension rollers for supporting the vehicle on the monorail and driving rollers set in opposition about the rail and mounted to both roll along and grip between them a central vertical web of the rail, each driving roller being connected to and driven by a drive motor which is suspended together with the appertaining driving roller from the unit on a link member free to pivot in a plane transverse to the rail, said link members forming part of a multiplying linkage from which the vehicle is suspended whereby the force exerted by the weight of the vehicle is transferred evenly to each of the driving rollers to cause them to grip the said central vertical web between them with a force which is effectively greater than the weight of the vehicle.

5. A propulsion suspension unit as claimed in claim 4, wherein each driving roller is driven by a hydraulic drive motor supplied with pressure fluid via flexible hosing from a power pack mounted upon the monorail vehicle and comprising a diesel-powered pump and associated fluid storage tank.

References Cited by the Examiner

UNITED STATES PATENTS

| | | | |
|---|---|---|---|
| 1,396,627 | 11/1921 | Denham | 105—30 |
| 2,316,223 | 4/1943 | Cheneau | 105—30 |
| 2,655,871 | 10/1953 | Mazzola | 105—30 |
| 2,722,897 | 11/1953 | Morey | 105—73 |
| 3,056,359 | 10/1962 | Fey | 105—30 |
| 3,192,872 | 7/1965 | Parent | 104—93 |

ARTHUR L. LA POINT, *Primary Examiner.*

B. FAUST, *Assistant Examiner.*